United States Patent Office 3,066,075
Patented Nov. 27, 1962

3,066,075
COMPOSITIONS COMPRISING AMPHETAMINE AND CARBOXYMETHYL CELLULOSE IN CHEMICALLY COMBINED FORM
Marshall E. Deutsch, Whippany, N.J., assignor to G. W. Carnrick Co., Newark, N.J., a corporation of New Jersey
No Drawing. Filed July 25, 1960, Ser. No. 44,897
19 Claims. (Cl. 167—65)

The present invention relates to a novel therapeutic product and to therapeutic compositions made therefrom.

It is well known that in recent years the medical armamentarium has been enhanced by the introduction of drugs in what may be referred to as time-released form. U.S. patents which disclose medication in such form include Nos. 2,736,682; 2,738,303; and 2,809,916–8.

Briefly stated, time-release refers to the fact that the drug is in such form as to give not only a fairly immediate effect but, in addition, the drug is in such form as to be released for effectiveness either more or less continuously or at intervals over an extended period of time, e.g., 8 hours or so. When the drug is in a form effective more or less continuously over a period of time it may be referred to as being in "trickle" form. When the drug is effective at intervals, e.g., in two bursts, it may be referred to as in "two shot" form.

It can easily be appreciated that the timed-release form possesses advantages in the administration of drugs. For one thing, the patient is not required to go through the drug ingesting process as often as otherwise. Then too, it is especially important in certain cases that either sustained or repeated effectiveness be provided. For example, in the case of sedatives it is desirable to control sleep over an extended period of around 8 hours. A "trickle" form would appear to be indicated. In the case of appetite suppression, the "two shot" or "three shot" type of time-release form may be desirable, so timed as to be effective at the patient's normal eating times.

One of the drugs employed in time-released form is amphetamine, in the form of its organic and inorganic acid addition salts, such as the succinate, tartrate, citrate, hydrochloride, phosphate and sulfate salts. While this drug has utility as an appetite depressant or anoretic, untoward side effects such as jitteriness and insomnia often result from its use.

It has been surprisingly found, in accordance with this invention, that dosage effective to retain the desirable anoretic qualities of amphetamine, without any substantial untoward side effects, can be realized by combining amphetamine with carboxymethyl cellulose to form a salt wherein about 1 to about 30 parts by weight are the amphetamine residue per about 72 parts by weight of the carboxymethyl cellulose residue. Moreover, to obtain the same anoretic effect as yielded by amphetamine in the form of its known salts, only two thirds as much amphetamine is needed in the form of the novel salt of this invention.

When the aforementioned novel salt was incorporated in timed-release tablets, capsules, etc., in accordance with this invention, it was further found, surprisingly, that the drug, in combination with sedatives or tranquilizers, not only exhibited "bursts" of effectiveness as an appetite suppressant at intervals of about 3½–4 hours, but that it also exhibited a trickle effect over an extended period, i.e., 7–8 hours.

In preparing the novel salt of this invention, an aqueous solution of sodium carboxymethyl cellulose is passed through a cation-exchange resin in the hydrogen form. Amphetamine is added to the resulting suspension and a solution is again obtained. The salt is dried by removing the water at a temperature not in excess of about 150° C. and in such manner as not to discolor the product. Vacuum drying, including spray drying, is a preferred mode of drying.

The resulting salt is a hard light colored solid, very soluble in water, and yields viscous solutions in water at concentrations of about 1% or more. Amphetamine may be recovered from the salt by making a solution alkaline with strong alkali, such as sodium hydroxide, and then steam distilling to recover the amphetamine.

The various optical forms of amphetamine, i.e., the $d$-, $l$- and $dl$-forms, may be used. It will, therefore, be understood that wherever the context so requires or admits, the term "amphetamine" includes each of its aforementioned forms, per se or inadmixture.

The ordinary carboxymethyl cellulose of commerce may be employed in accordance with this invention. It is an especial advantage of this invention that carboxymethyl cellulose having a wide range of average molecular weight is useful. Illustrative of such a range is that between about 10,000 and about 600,000.

Any cationic-exchange resin which is capable of replacing a metallic ion such as sodium with hydrogen is suitable in the aforementioned process. Such resins include, for example, polystyrene sulfonic acid and carboxylic acid resins such as those marketed in the U.S.A. under the designations: Duolite C–25 (made by Chemical Process, Redwood City, Calif.), Amberlite IR–120H and IRC–50 (made by Rohm & Haas, Philadelphia, Pa.), Dowex 50 (made by Dow Chemical Company, Midland, Mich.), and Zeocarb 225 (made by Pfaudler-Permutit, New York, N.Y.).

As aforementioned, the ratio of the amphetamine equivalent to that for carboxymethyl cellulose in the novel salt is from about 1 to about 30 parts by weight of the former to about 72 parts by weight of the latter. Especially desirable results are obtained when the ratio is from about 20 to about 30 parts of amphetamine equivalent to about 72 parts of carboxymethyl cellulose equivalent.

Therapeutic compositions in accordance with this invention are made by combining the novel salt of this invention with a sedative and/or a tranquilizer, in accordance with medical indications and considerations as to compatibility, etc.

Sedatives which may be used include barbiturates, such as phenobarbital, barbital, amobarbital, butabarbital and secobarbital; and/or other sedatives, such as ethinamate, methylparafynol, methyprylon, glutethimide and ethchlorvynol.

Tranquilizers which may be used include meprobamate, chlormethazanone, phenaglycodol, hydroxyzine, ectylurea, captodiamine hydrochloride, buclyzine, methaminodiazepoxide, deserpidine, thiopropazate, 1-piperidineethanol benzilate hydrochloride, benactyzine hydrochloride, oxanamide and chlorpromazine.

The ratio of novel salt to barbiturates employed in the instant therapeutic compositions is within the range from about 1 to about 2 parts of the salt to about 1 part of the barbiturate, by weight. Especially satisfactory results are obtained when said ratio is about 4 parts of novel salt to about 3 parts of barbiturate.

As will be understood in the art, the amounts of the other sedatives and of the tranquilizers which can be used vary over wide limits. These amounts, expressed as ratios relative to the dosage of barbiturates, are given below:

Ethinamate—1
Methylparafynol—5
Methprylon—4
Glutethimide—5
Ethchlorvynol—5

Meprobamate—5
Chlormethazanone—2
Phenaglycodol—2
Hydroxyzine—2
Ectylurea—5
Captodiamine hydrochloride—1
Buclyzine—⅓
Methaminodiazepoxide—¼
Deserpidine—1/500
Thiopropazate—⅛
1-piperidine-ethanol benzilate hydrochloride—1/40
Benactyzine hydrochloride—1/40
Oxanamide—3
Chlorpromazine—1

The above numbers are termed the barbiturate equivalents of the indicated materials.

In preparing compositions incorporating sedatives other than barbiturates and/or tranquilizers, with or without barbiturates, it is a simple matter to calculate the correct amounts to be used, making due allowance for the above dosage strengths and for all of the sedatives and/or tranquilizers employed. For example, if methylparafynol is used to replace all barbiturates, then 5 times as much of the former, compared with the effective amount of barbiturate, should be used. Or, if it is desired to use equal dosages of a barbiturate, another sedative, e.g., methprylon, and a tranquilizer, e.g., deserpidine, then the parts of each to employ, on the basis of 1–2 parts by weight of the novel salt of this invention are as follows:

Barbiturate—⅓ part of 1=⅓ part
Methprylon—⅓ part of 4=4/3 part
Deserpidine—⅓ part of 1/500=1/1500 part The therapeutic compositions made in accordance with this invention exhibit desirable effects, as aforesaid, in dosages containing from about 15 mg. to about 45 mg. of the novel salt and about 10 mg. to about 30 mg. of barbiturate equivalent, the ratio of said salt to the sedative and/or tranquilizer, being from about 1 to about 2 parts by weight of the former to about the indicated parts of the latter. For barbiturate, preferred dosage levels are those comprising from about 25 mg. to about 40 mg. of the salt to from about 20 mg. to about 30 mg. of barbiturate.

As aforesaid, the therapeutic compositions of this invention are employed so as to be in the aforementioned timed-release form. Various methods are known for incorporating drugs in capsules, tablets, etc., so as to be effective over a predetermined period of time. Such methods, including those disclosed in U.S. Patents 2,736,682; 2,809,916; 2,809,917 and 2,809,918, may be used to carry out the purposes of this invention. Other methods for providing the timed-release effect which may be specifically referred to here are (a) those involving the suspension of enteric coated timed-release pellets containing the ingredients of the novel therapeutic composition in a solution of the novel composition in a solvent such as water, with or without ethanol or glycerol or dissolved excipients such as sugar or sorbitol and flavoring agents; and (b) a system comprising the novel composition in dissolved form for immediate release; the novel composition suspended in globules of a digestible fatty oil material which is not digested for 3–4 hours, e.g., olive oil in globules of the order of about 10 to about 100 microns, as the second release; and the novel composition suspended in oily material which is not digested for about 6–8 hours, such as beef suet of about 50 to about 500 microns, in particle size.

If desired, tablets having 2 or more layers, desirably of different coloration may be used. All but one of the layers may be placebos. Such tablets are particularly indicated where maximum psychological effect is desired.

In order more clearly to illustrate the invention, the following examples are given. Unless otherwise stated the parts are by weight.

EXAMPLE I

*Preparation of Salt of Amphetamine and Carboxymethyl Cellulose*

One hundred milliliters of an aqueous solution, 1% strength, of sodium carboxymethyl cellulose (Hercules Powder Company, CMC7HP), having an approximate average molecular weight of 350,000 and a degree of substitution, i.e., number of hydroxyl groups in each anhydroglucose unit which has combined with acetate, of 0.75, was passed at a rate of one ml. per minute through a column 1″ high containing 4 grams of polystyrene sulfonic acid cation-exchange resin (Amberlite IR–120H). The carboxymethyl cellulose, which formed, went into suspension and was collected in a separate container. The column was rinsed with 2 five ml. portions of distilled water which was added to the suspension. To 110 milliliters of the resulting suspension was added 0.36 gram of dextro-amphetamine free base, giving rise to the disappearance of the suspension and formation of a solution.

The solution of the salt of carboxymethyl cellulose and d-amphetamine was dried by heating to 140° C. for half an hour.

There was obtained a hard, faintly off-white solid, which could be ground into a powder. The solid was very soluble in water and formed a viscous 1% solution when dissolved in water. It assayed 27.6% amphetamine when tested by weighing out a sample, dissolving it in water, adding excess 20% sodium hydroxide solution, steam distilling in a Kjeldahl distillation apparatus into standard $H_2SO_4$ solution, and titrating the unneutralized sulfuric acid with standard sodium hydroxide solution.

EXAMPLE II

*Tablets Containing Salt of Dextro-Amphetamine Carboxymethyl Cellulose and Sedatives and/or Tranquilizers*

Pellets were separately prepared from the novel dextro-amphetamine-carboxymethyl cellulose salt, as prepared in accordance with Example I and from phenobarbital, amobarbital, secobarbital, barbital and butabarbital. Nine hundred (900) grams of each drug was so pelletized. Two thirds of the pellets of each specified material, having an average diameter of 35 mils, were separately enterically coated with a wax-fat coating solution made by admixing 6300 gm. of glyceryl monostearate, 700 gm. of white beeswax (U.S.P.) and 21,000 cc. of carbon tetrachloride. The wax-fat solution was at a temperature of 70° C. After applying 425 cc. of wax-fat solution, the pellets were dried with air and the coating operation was repeated until the weight of the material being coated had increased 15%, at which point one-half of the batches of coated pellets was removed and dusted with talc in separate coating pans. The coating is of such thickness as to be dissolved or digested in the body in about 3½ hours and such pellets are referred to as 3½ hour enterically-coated pellets.

The remainder of the separate batches was further separately repeatedly coated with the wax-fat solution and dried until the weight of the material increased 15% more over its original weight. The heavier coated pellets were dusted with talc in a separate coating pan. The coating is of such thickness as to be digested in the body in about 7 hours and such pellets are referred to as 7 hour enterically-coated pellets.

The uncoated pellets, the 3½ hour enterically-coated pellets and the 7 hour enterically-coated pellets of each material specified herein were mixed together, so that for each of said materials above specified there was formed a batch of approximately 1035 grams of pellets.

Eight placebo granulations were prepared, each one by granulating 500 grams lactose, 300 grams sucrose and 100 grams starch with a 10% starch solution containing F.D. and C. approved dyes to make the granulations respectively orange, blue, pink, violet, purple, red, yellow and green. Granulation was performed by mixing the starch solution with the mixed dry powders until a stiff paste was formed and forcing the paste through a sieve. The material was then dried, broken up and sifted into fractions (a) passing a 24-mesh screen, (b) retained by a 24-mesh screen but passing a 14-mesh screen and (c) retained by a 14-mesh screen. The last was broken up and fractionated into (a) and (b). Fraction (b) was weighed and to it were added 10% of its weight of fraction (a) and 0.25% of its weight of zinc stearate. A similar procedure was followed with each of the eight placebo granulations.

To make tablets containing 26.7 mg. dextro-amphetamine carboxymethyl cellulose and 20 mg. butabarbital, a mixture was prepared from 786.3 grams of precipitated calcium carbonate, U.S.P., 119.2 grams of the aforesaid pelletized mixture of d-amphetamine carboxymethyl cellulose, and 92.0 grams of the aforesaid pelletized mixture of butabarbital. To this mixture was added 2½ grams of zinc stearate the whole being thoroughly mixed.

A three-layer tablet press was fitted with ⅜" dies and ⅜" standard concave punches of which the upper punches may be debossed, e.g., with script C's. The first hopper was filled with orange placebo granulation and the machine was adjusted to make 150-mg. bottom layers of this material. The second hopper was then filled with the just-mentioned calcium carbonate-pellet mixture and the machine was then adjusted to make 400-mg. tablets consisting of a 150-mg. bottom layer of orange placebo granulation and a 250 mg. upper layer of the other mixture. The third hopper was then filled with yellow placebo granulation, and the machine was then adjusted so that a third layer of 100 mg. of this material was compressed on top of the other two layers. The machine was then adjusted so that the layers cohered well and the final hardness of tablets was at least 8 units on the Strong-Cobb hardness tester. Finally, the weights of individual layers were rechecked and the machine turned on to compress tablets automatically. Tablets so made had a thickness of about 0.265".

In a similar fashion, tablets were made:

(a) Containing 40 mg. dextro-amphetamine carboxymethyl cellulose and 30 mg. butabarbital and with orange bottoms and green tops;
(b) Containing 15 mg. dextro-amphetamine carboxymethyl cellulose and 11.2 mg. butabarbital and with orange bottoms and red tops;
(c) Containing 26.7 mg. dextro-amphetamine carboxymethyl cellulose and 20 mg. phenobarbital and with blue bottoms and yellow tops;
(d) Containing 40 mg. dextro-amphetamine carboxymethyl cellulose and 30 mg. phenobarbital and with blue bottoms and green tops;
(e) Containing 26.7 mg. dextro-amphetamine carboxymethyl cellulose and 20 mg. amobarbital and with pink bottoms and yellow tops;
(f) Containing 40 mg. dextro-amphetamine carboxymethyl cellulose and 30 mg. amobarbital and with pink bottoms and green tops;
(g) Containing 26.7 mg. dextro-amphetamine carboxymethyl cellulose and 20 mg. secobarbital and with violet bottoms and yellow tops;
(h) Containing 40 mg. dextro-amphetamine carboxymethyl cellulose and 30 mg. secobarbital and with violet bottoms and green tops;
(i) Containing 26.7 mg. dextro-amphetamine carboxymethyl cellulose and 20 mg. barbital and with purple bottoms and yellow tops; and
(j) Containing 40 mg. dextro-amphetamine carboxymethyl cellulose and 30 mg. barbital and with purple bottoms and green tops.

Tablets made in accordance with this example were taken by subjects before breakfast. Suitable intervals (2–4 days) occurred between successive tablet ingestions, in order to avoid having habituation affect the results.

It was found that, while differences in results were noted, all tablets gave satisfactory results. All-day appetite suppression without untoward effects was noted. The tablets with butabarbital appeared to give the best anoretic response.

When compared with corresponding tablets made in accordance with the foregoing, and employing d-amphetamine sulfate in place of the novel salt made in accordance with Example I, it was found that equivalent subject responses were obtained when the unit dosage of the latter was 27 mg. (containing only 7 mg. of amphetamine) as compared with 15 mg. of amphetamine sulfate (containing 11 mg. of amphetamine).

If desired, the experiment may be repeated with substantially the same results by substituting the corresponding amounts of any of the aforementioned other sedatives or tranquilizers for the barbiturates. If desired, the sedatives and tranquilizers may be used per se or in admixture, so long as they are not therapeutically incompatible.

EXAMPLE III

*Capsules Containing Salt of Amphetamine-Carboxymethyl Cellulose and Sedatives and/or Tranquilizers*

The immediately preceding example was repeated, except that in place of tablets the various compositions were compounded in the form of capsules. This was done simply by placing the uncoated, 3½-hour enterically-coated pellets, and 7-hour enterically-coated pellets into gelatin capsules.

Substantially the same results were obtained as in the case of the preceding example.

While I have described my invention in detail in its preferred embodiment, it will be obvious to those skilled in the art, after understanding the invention, that various changes and modifications may be made therein without departing from the spirit or scope thereof. I aim in the appended claims to cover all such modifications and changes.

I claim:

1. A solid material comprising amphetamine and carboxymethyl cellulose in chemically combined form wherein the amphetamine portion is from about 1 to about 30 parts by weight per the carboxymethyl cellulose portion of about 72 parts by weight, said material having anoretic properties without any substantial untoward amphetamine side effects.

2. A solid material in accordance with claim 1, wherein the amphetamine portion is from about 20 to about 30 parts by weight per the carboxymethyl cellulose portion of about 72 parts by weight, said material having anoretic properties without any substantial untoward amphetamine side effects.

3. A therapeutic composition which comprises a solid material in accordance with claim 1 and at least one member selected from the group consisting of a sedative and a tranquilizer, said composition having anoretic properties exhibited in trickle and burst forms over an extended period and characterized by the absence of any substantial untoward amphetamine side effects.

4. A therapeutic composition in accordance with claim 3 wherein said member is a barbiturate.

5. A therapeutic composition which comprises a solid material comprising amphetamine and carboxymethyl cellulose in chemically combined form wherein the amphetamine portion is from about 20 to about 30 parts by weight per the carboxymethyl cellulose portion of about 72 parts by weight and a barbiturate, said salt and said barbiturate being present in a ratio from about 1 to about 2 parts of the former to about 1 part of the latter, said composition having anoretic properties exhibited in trickle and burst forms over an extended period and characterized by the absence of any substantial untoward amphetamine side effects.

6. A composition in accordance with claim 5, wherein said barbiturate is barbital.

7. A composition in accordance with claim 5, wherein said barbiturate is amobarbital.

8. A composition in accordance with claim 5, wherein said barbiturate is secobarbital.

9. A composition in accordance with claim 5, wherein said barbiturate is butabarbital.

10. A composition in accordance with claim 5, wherein said barbiturate is phenobarbital.

11. A therapeutic preparation in timed release dosage unit form and having anoretic properties without any substantial untoward amphetamine side effects, comprising about 15 to about 45 mg. of a solid material comprising amphetamine and carboxymethyl cellulose wherein the amphetamine portion is from about 1 to about 30 parts by weight per the carboxymethyl cellulose portion of about 72 parts by weight and from about 10 mg. to about 30 mg. of the barbiturate equivalent of at least one member selected from the group consisting of a sedative and a tranquilizer, the ratio of said material to said member being from about 1 to about 2 parts of the former to about 1 part of the barbiturate equivalent of the latter.

12. A preparation in accordance with claim 11, wherein said member is a barbiturate.

13. A therapeutic preparation in timed-release dosage unit form and having anoretic properties without any substantial untoward amphetamine side effects comprising about 25 mg. to about 40 mg. of a solid material comprising amphetamine and carboxymethyl cellulose wherein the amphetamine portion is about 20 to about 30 parts by weight per the carboxymethyl cellulose portion of about 72 parts by weight and from about 20 mg. to about 30 mg. of phenobarbital, the ratio of said material to the phenobarbital being about 4 parts of the former to about 3 parts of the latter.

14. A therapeutic preparation in timed-release dosage unit form and having anoretic properties without any substantial untoward amphetamine side effects comprising about 25 mg. to about 40 mg. of a solid material comprising amphetamine and carboxymethyl cellulose wherein the amphetamine portion is about 20 to about 30 parts by weight per the carboxymethyl cellulose portion of about 72 parts by weight and from about 20 mg. to about 30 mg. of barbital, the ratio of said material to the barbital being about 4 parts of the former to about 3 parts of the latter.

15. A therapeutic preparation in timed-release dosage unit form and having anoretic properties without any substantial untoward amphetamine side effects comprising about 25 mg. to about 40 mg. of a solid material comprising amphetamine and carboxymethyl cellulose wherein the amphetamine portion is about 20 to about 30 parts by weight per the carboxymethyl cellulose portion of about 72 parts by weight and from about 20 mg. to about 30 mg. of amobarbital, the ratio of said material to the ambobarbital being about 4 parts of the former to about 3 parts of the latter.

16. A therapeutic preparation in timed-release dosage unit form and having anoretic properties without any substantial untoward amphetamine side effects comprising about 25 mg. to about 40 mg. of a solid material comprising amphetamine and carboxymethyl cellulose wherein the amphetamine portion is about 20 to about 30 parts by weight per the carboxymethyl cellulose portion of about 72 parts by weight and from about 20 mg. to about 30 mg. of secobarbital, the ratio of said material to the secobarbital being about 4 parts of the former to about 3 parts of the latter.

17. A therapeutic preparation in timed-release dosage unit form and having anoretic properties without any substantial untoward amphetamine side effects comprising about 25 mg. to about 40 mg. of a solid material comprising amphetamine and carboxymethyl cellulose wherein the amphetamine portion is about 20 to about 30 parts by weight per the carboxymethyl cellulose portion of about 72 parts by weight and from about 20 mg. to about 30 mg. of butabarbital, the ratio of said material to the butabarbital being about 4 parts of the former to about 3 parts of the latter.

18. Solid dextro-amphethamine salt of carboxymethylcellulose, assaying 27.6% amphetamine, being characterized by anoretic properties without any substantial untoward amphetamine side effects.

19. A therapeutic composition comprising about 26.7 parts of the solid dextro-amphetamine salt of carboxymethylcellulose assaying 27.6% amphetamine, and about 20 parts of butabarbital, said composition characterized by having anoretic properties exhibited in burst and trickle forms over an extended period of time and by absence of any substantial untoward amphetamine side effects.

References Cited in the file of this patent

UNITED STATES PATENTS

| | | |
|---|---|---|
| 2,725,336 | Sumner et al. | Nov. 29, 1955 |
| 2,851,453 | Kennon et al. | Sept. 9, 1958 |
| 2,906,665 | Doyle | Sept. 29, 1959 |
| 2,939,820 | Gerber et al. | June 7, 1960 |

OTHER REFERENCES

Hackh's Chemical Dictionary, 3rd ed., 1944, entry "Salt," pp. 753–754.

Whistler et al.: "Industrial Gums, Polysaccharides and Their Derivatives," Academic Press, N.Y., 1959, in POSL Sept. 28, 1959, "Algin," pp. 55–82; "Sodium Carboxymethylcellulose," pp. 643, 674.